United States Patent

Isono et al.

Patent Number: 5,459,775
Date of Patent: Oct. 17, 1995

[54] SERVICE SYSTEM FOR INTERCONNECTING HETEROGENEOUS COMMUNICATION TERMINALS, AND COMMUNICATION NODE DEVICE AND COMMUNICATION TERMINAL USED IN THE SAME

[75] Inventors: Osamu Isono; Norimasa Yano; Toshimasa Fukui, all of Kawasaki, Japan

[73] Assignee: Fujitsu Limited, Kanagawa, Japan

[21] Appl. No.: 187,294

[22] Filed: Jan. 25, 1994

[30] Foreign Application Priority Data

Apr. 15, 1993 [JP] Japan ..................... 5-088543

[51] Int. Cl.⁶ .................. H04M 11/00; H04M 1/64
[52] U.S. Cl. ............... 379/93; 379/88; 379/100
[58] Field of Search ............ 379/93, 94, 96, 379/97, 98, 108, 88; 370/110.1

[56] References Cited

U.S. PATENT DOCUMENTS

| | | | |
|---|---|---|---|
| 4,837,798 | 6/1989 | Cohen et al. | 379/88 |
| 4,998,248 | 3/1991 | Matsugaki | 370/110.1 |
| 5,146,488 | 9/1992 | Okada et al. | 379/100 |

FOREIGN PATENT DOCUMENTS 22264  8/1990  Japan .
2222356  9/1990  Japan .

Primary Examiner—Curtis Kuntz
Assistant Examiner—Jason Chan

[57] ABSTRACT

The present invention relates to a service system for interconnection between different kinds of communication terminals and to a communication node device and a communication terminal used in the same. The object of the invention is to offer versatility and to need no operation for media conversion by an originating party. An information factor indicating a communication terminal attribute is inserted in a message to establish a call between a communication terminal and a communication node device. In the communication node device, when a communication refusal from a destination communication terminal due to a communication terminal attribute disagreement is recognized in response to a destination message sent from the originating communication terminal to the destination communication terminal, a medium receivable by the destination communication terminal is selected and the destination message from the originating communication terminal is corrected. The corrected message is forwarded to the destination communication terminal. Then when communication is established, the media converting means notifies the destination communication terminal of the destination call from the originating communication terminal, while it notifies the originating communication terminal of a communication establishment through the media conversion.

14 Claims, 13 Drawing Sheets

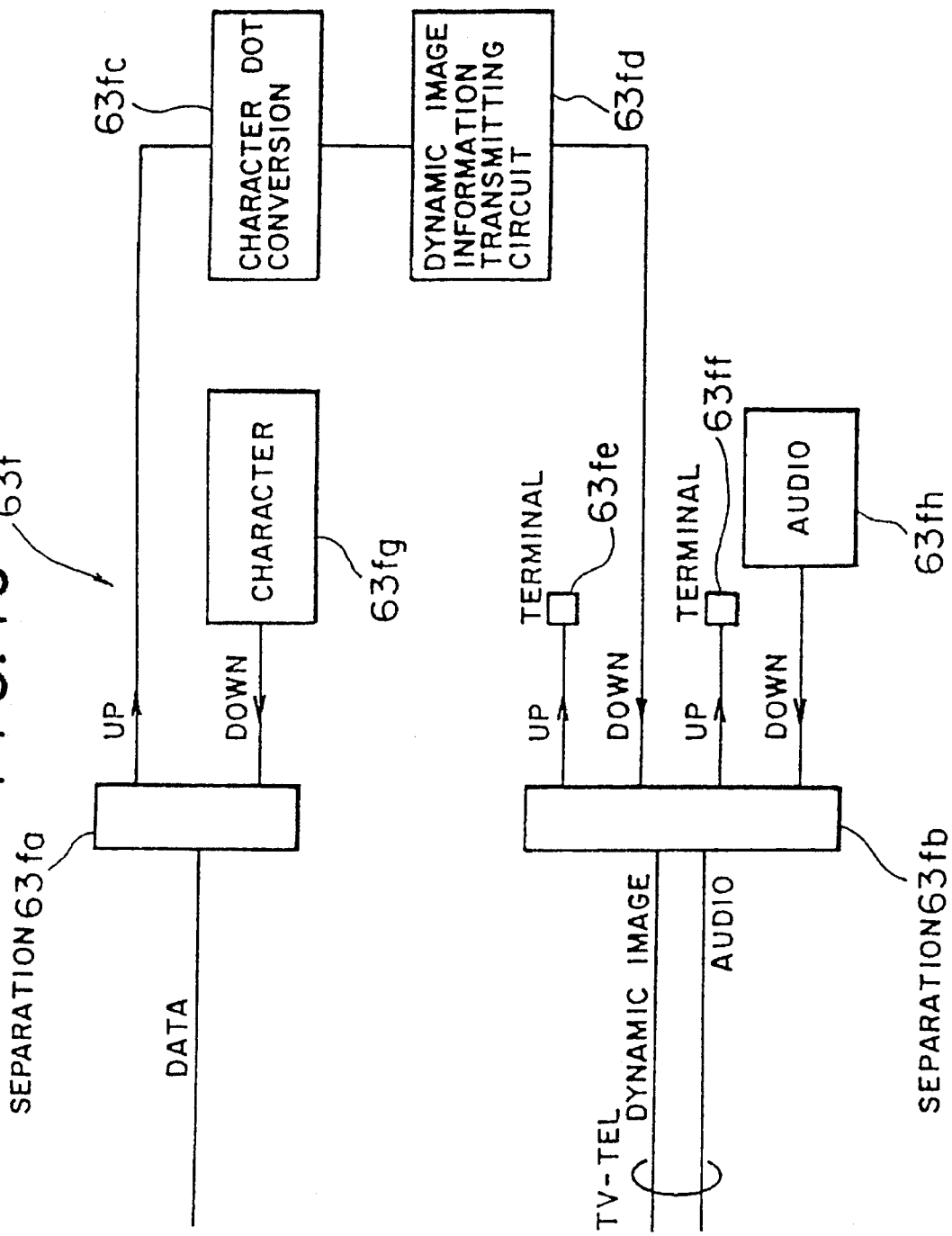

```
ORIGINATING MEDIA CLASSIFICATION
  7 6 5 4 3 2 1
  0 0 0 0 0 0 0    RESERVED
  0 0 0 0 0 0 1    TELEPHONE (AUDIO)
  0 0 0 0 0 1 0    DATA
  0 0 0 0 0 1 1    FAX
  0 0 0 0 1 0 0    PICTURE TELEPHONE
  OTHERS           RESERVED
```

```
MEDIA CONVERSION ENABLING DISPLAY
  2 1
  0 0    RESERVED
  0 1    CONVERSION IMPOSSIBLE
  1 0    CONVERSION POSSIBLE
  1 1    RESERVED
```

SERVICE SYSTEM FOR INTERCONNECTING HETEROGENEOUS COMMUNICATION TERMINALS, AND COMMUNICATION NODE DEVICE AND COMMUNICATION TERMINAL USED IN THE SAME

BACKGROUND OF THE INVENTION

1) Field of the Invention

The present invention relates to a service system for interconnecting heterogeneous communication terminals, the system including plural communication terminals for treating different media and a communications network including media converting means to interconnect the communications terminals via a communication node device. The present invention also relates to a communication node device and a communication terminal used in the above mentioned service system.

2) Description of the Related Art

Recently, communications for telephone, facsimile (FAX), data communications, or the like has been realized by constructing a dedicated network for the corresponding medium. In the communications, addresses (telephone numbers) are provided corresponding to lines (terminals). For that reason, since a communicator dials to a terminal that has much probability that the opposite party will take a call, no establishment of communications tends to occur.

In order to avoid a communication failure occurring in communications including telephone, FAX and data communications, it has been studied to realize a so-called personal communication where an address is personally given to register a communicator's positional information to a network (or a nearby access point), thus enabling a person to person communication, the personal communication being studied in terms of universal personal telecommunication (UPT) in ITU-TS (International Telecommunication Union).

FIG. 14 is a diagram used for explaining a conventional UPT system. Referring to FIG. 14, terminals 101a to 101c are communication terminals used by users that are accommodated in the exchanges 102a to 102c, respectively.

Moreover, the exchanges 102a to 102c are mutually connected via communication networks to execute mutual communications between the terminals 101a to 101c.

A communication terminal 101a is daily used by an user 106 and the telephone number of the communication terminal 101a is owned by the user 106. The exchange 102a is connected to a subscriber information database 103 to store subscriber information. The communications center 104 monitors communication between all the communication terminals and prepares the database 105.

The subscriber information database 103 or database 105 stores a user's telephone number of a current terminal to an address located at each of user registered identifiers (IDs). In this case, the subscriber information database 103 stores the number corresponding to the communication terminal 102b at a current location into the address A corresponding to the ID of the user 106. The ID number of the user 106, for example, includes the telephone number information of the communication terminal 101a conventionally used.

According to the above configuration, the UPT service system, for example, operates as follows:

That is, an user 106 uses an ID card to register his own ID via the communication terminal 101b (refer to (1) in FIG. 14).

Then, the subscriber database 103 in the exchange 102a or the service information database 105 in the communications center 104 stores the telephone number of the communication terminal 101b to an address arranged every user's IDs so that it is registered that the user 106 is at the communication terminal 101b (refer to (2) in FIG. 14).

When the user 107 wants to communicate with the user 106, he uses the telephone to dial the private number of the user 106 using the communication terminal 101c. Then the originating call information is inputted to the exchange 102a (refer to (3) in FIG. 14). Then the exchange 102a retrieves the subscriber information database 103 or the database 105 in the communications center 104 to the current communication terminal number (or the telephone number of the communication terminal 101b) of the user 106 (refer to (4) in FIG. 14).

When the exchange 102a receives the telephone number of the communication terminal 101b, it forwards the telephone call from the user 107 via the communication terminal 101c to the exchange 102b thus enabling communication between the users 106 and 107 (refer to (5) in FIG. 14).

In the UPT service system described above, for example, it is desirable that an user 106, which receives a communication call, can mutually communicate using a different kind of communication terminal, without depending on kinds of communication terminals. To cope with the problem, it is necessary to prepare means for mutually communicating between any kinds of communication terminals.

Japanese Laid-open patent publication No. 02-2264 discloses that mutual communications can be performed by selecting data (media classifications and parameter group) previously stored in a message processing device (exchange) based on an originating number, and a destination number and selecting a suitable media conversion function based on the data.

Japanese Laid-open patent publication No. 02-222356 discloses that a center accommodates a media information storage file for storing user's IDs and media classified data, and enables mutual communications by selecting a media classification on reference to a sending party's ID and a receiving party's ID (transmitted from an originating side) and selecting a suitable media conversion function.

However, in such conventional proposals, the system disclosed in Japanese Laid-open patent publication No. 02-2264 has a disadvantage in that the media conversion can be executed only to terminals that have been previously registered, whereby the prior art lacks in versatility.

Moreover, there is a disadvantage in that the system disclosed in Japanese Laid-open patent publication No. 02-22356 requires an originating side to operate a media conversion process, thus offering inconvenience for a user.

SUMMARY OF THE INVENTION

The present invention is made to overcome the above mentioned problems. An object of the present invention is to provide a service system for interconnecting heterogeneous communication terminals where no operation is needed for media conversion by an originating party while its versatility is maintained.

Another object of the present invention is to provide a communication node device used in the service system for an interconnection between heterogeneous communication terminals.

Still another object of the present invention is to provide a communication terminal used in the service system for an interconnection between heterogeneous communication terminals.

In order to achieve the above objects, according to the present invention, the service system which interconnects heterogeneous communication terminals is characterized by a communication network, the communication network including plural communication terminals each which treats a different medium; a communication node device; and media converting means connected with the communication terminals via the communication node device; the communication network including an information factor indicating an attribute of each of the communication terminals, the information factor being inserted in a message regarding a call establishment between each of the communication terminals and the communication node device; the communication node device for operating so as to select a medium receivable by the destination communication terminal, to correct the destination message from the originating communication terminal, and to forward the corrected destination message to the destination communication terminal, when a communication refusal due to a communication terminal attribute disagreement is recognized in response to a destination message sent from the originating communication terminal to the destination communication terminal; the media converting means, after the communication establishment, for notifying the destination communication terminal that a destination call from the originating communication terminal has been received and for notifying the originating communication terminal that a communication has been established through the media conversion; whereby the originating communication terminal is notified that the media conversion has established a communication.

In an embodiment the information factor indicating an attribute of each of the communication terminals inserted in a message regarding a call establishment between each of the communication terminals and said communication node device, includes media conversion enable information which notifies the communication node device that a user of the originating communication terminal wants to execute a forced destination call to the destination communication terminal.

Media converting means may be arranged in the communication node device.

Alternatively the media converting means may be arranged in a communications center different from the communication node device.

In an embodiment the communication terminals include a telephone terminal and a facsimile terminal; and the media converting means includes means for enabling an information conversion between the telephone terminal and the facsimile terminal.

In an embodiment, the communication terminals may include a telephone terminal and a data terminal, and the media converting means includes means for enabling an information conversion between the telephone terminal and the data terminal.

The communication terminals may include a telephone terminal and a picture telephone terminal, and the media converting means includes means for enabling an information conversion between the telephone terminal and the picture telephone terminal.

The communication terminals may include a facsimile terminal and a data terminal, and the media converting means includes means for enabling an information conversion between the facsimile terminal and the data terminal.

The communication terminals may include a facsimile terminal and a picture telephone terminal, and the media converting means includes means for enabling an information conversion between the facsimile terminal and the picture telephone terminal.

The communication terminals may include a data terminal and a picture telephone terminal, and the media converting means includes media for interchanging information between the data terminal and the picture telephone terminal.

According to the present invention, a communication node device used for the service system which interconnects heterogeneous communication terminals is provided, which comprises transmit/receive means for interchanging information between communication terminals; communication refusal recognizing means for recognizing a communication refusal via the transmit/receive means due to a communication terminal attribute disagreement in response to a destination message sent from a destination communication terminal to an originating communication terminal, the destination message having an information factor indicating a communication terminal attribute; selecting means for selecting a medium receivable by the destination communication terminal when the communication refusal recognizing means recognizes that the destination communication terminal has executed a communication refusal due to the communication terminal attribute disagreement; destination message correcting means for correcting a destination message from the originating communication terminal based on a selection result when the selecting means selects a medium being receivable by the destination communication terminal; forwarding means for forwarding a corrected message from the destination message correcting means to the destination communication terminal via the transmit/receive means; destination communication terminal notifying means for notifying the destination communication terminal that a destination call has been provided from the originating communication terminal via the media converting means when a communication is established by forwarding a corrected destination message by the forwarding means; and originating communication terminal notifying means for notifying the originating communication terminal that the communication has been established through a media conversion, via the transmit/receive means.

In an embodiment, the information factor indicating an attribute of each of the communication terminals inserted in a message regarding a call establishment between each of the communication terminals and the communication node device, includes media conversion enable information which notifies the communication node device that a user of the originating communication terminal wants to execute a forced destination call to the destination communication terminal.

According to yet another embodiment, the communication terminal used in a service system for interconnecting heterogeneous communication terminals, is provided, which comprises transmit/receive means for interchanging information with communication node device; judging means for judging whether it is possible to communicate with an originating communication terminal, based on an information factor when a destination message sent from the communication node terminal to the originating communication terminal is received via the transmit/receive means, the information factor indicating an originating communication terminal attribute included in the destination message; communication refusal transmitting means for transmitting a communication refusal due to a communication terminal attribute disagreement to the communication node device via the transmit/receive means when the judging means judges that a communication is not performed to the originating communication terminal due to the communication terminal attribute disagreement; and notifying means for notifying that a destination call from the originating communication terminal has sent from the communication node device to the destination communication terminal after the communication refusal transmitting means transmitted a communication refusal.

In an embodiment, the information factor indicating an attribute of each of the communication terminals inserted in a message regarding a call establishment between each of the communication terminals and the communication node device, includes media conversion enable information which notifies the communication node device that a user of the originating communication terminal wants to execute a forced destination call to the destination communication terminal.

According to a further aspect of the invention, the communication terminal used in a service system for interconnecting heterogeneous communication terminals comprises transmit/receive means for interchanging information with communication node device; communication terminal attribute information factor inserting means for insecting an information factor indicating a communication terminal attribute in a destination message when a destination message is transmitted to the communication node device via the transmit/receive means; and notifying means for notifying information that a communication has been established through a media conversion, from the communication node device via the transmit/receive means.

Therefore, the present invention has the following advantages:

(1) Even if a communication refusal signal is sent from a destination communication terminal, a forced calling can be performed through a media conversion process, whereby the user at the sending side can enjoy convenience.

(2) An user at an originating or destination side can exactly understand information regarding communications.

(3) Versatile communications can be realized between different kinds of terminals by performing a media conversion for which no registration is required between specific communication terminals.

(4) It is not needed that an originating party executes the media conversion process so that the present invention offers convenience for a user.

BRIEF DESCRIPTION OF THE DRAWINGS

FIG. 10 is a diagram showing media converting circuits for a data terminal and a picture telephone terminal;

DESCRIPTION OF THE PREFERRED EMBODIMENTS

Referring to the attached drawings, an explanation will be made in detail as for preferred embodiments of the service system according to the present invention. The aspect of the present invention will be explained below with reference to the drawings.

Figure 1:
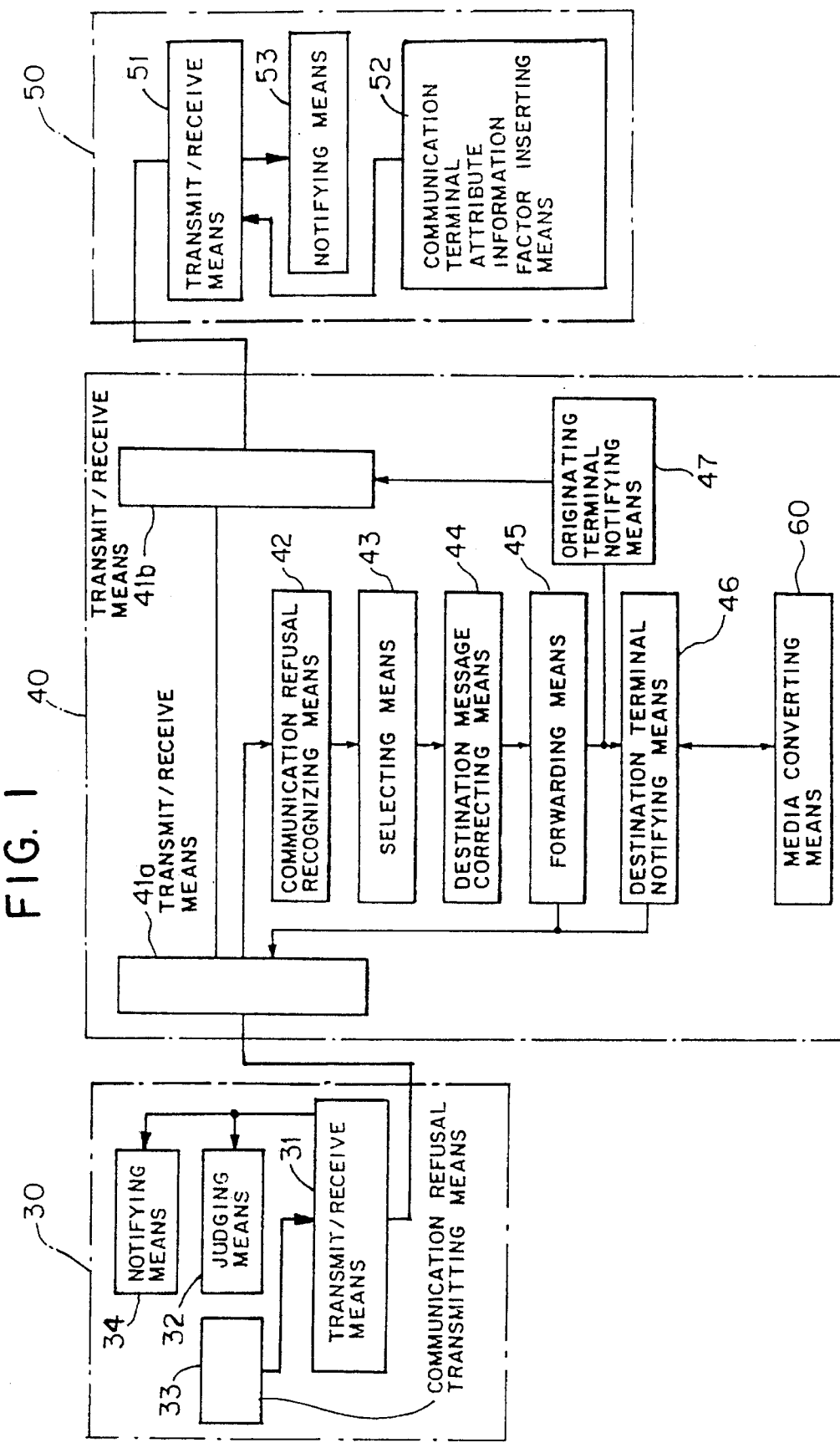
FIG. 1 is a block diagram showing the aspect of the present invention.

(a) The aspect of the invention:

FIG. 1 is a block diagram showing an aspect of the present invention. Referring to FIG. 1, numeral 40 represents a communication node device. An originating communication terminal 50 communicates with a destination communication terminal 30 via the communication node device 40. The communication node terminal 40 includes transmit/receive means 41a and 41b, communication refusal recognizing means 42, selecting means 43, destination message correcting means 44, forwarding means 45, destination terminal notifying means 46, and originating terminal notifying means 47, and media converting means 60.

The destination communication terminal 30 includes transmit/receive means 31, judging means 32, communication refusal transmitting means 33, and notifying means 34.

The originating communication terminal 50 includes transmit/receive means 51, communication terminal attribute information factor inserting means 52, and notifying means 53.

In the communication node device 40, the transmit/receive means 41a interchanges information with the destination communication terminal 30 while the transmit/receive means 41b interchanges information with the originating communication terminal 50.

The communication refusal recognizing means 42 recognizes a communication refusal due to a communication terminal attribute disagreement sent from the destination communication terminal 30 via the transmit/receive means 41a in response to a destination message including an information factor indicating the communication terminal attribute sent from the originating communication terminal 50 to the destination communication terminal 30.

The selecting means 43 selects a medium receivable by the destination communication terminal 30 when the communication refusal recognizing means 42 recognizes that the destination communication terminal 30 has refused due to a communication terminal attribute disagreement.

When the selecting means 43 selects a medium receivable by the destination communication terminal 30, the destination message correcting means 44 corrects a destination message from the originating communication terminal 50 based on the selected result.

The forwarding means 45 forwards the destination message corrected by the destination message correcting means 44 to the destination communication terminal 30 via the transmit/receive means 41a.

When a communication is established by forwarding the corrected destination message by the forwarding means 45, the destination communication terminal notifying means 46 notifies the destination communication terminal 30 that a destination call from the originating communication terminal 50 has been received by the media converting means 60.

The originating communication terminal notifying means 47 notifies the originating communication terminal 50 that a communication has been established by executing a media conversion, via the transmit/receive means 41b.

In the destination communication terminal 30, the transmit/receive means 31 interchanges information with the communication node device 40.

The judging means 32 judges whether a communication to the originating communication terminal 50 is performed based on an information factor indicating the attribute of the originating communication terminal 50 inserted in the destination message when the destination message sent from the communication node device 40 to the originating communication terminal 50 is received via the transmit/receive means 31.

The communication refusal transmitting means 33 transmits a communication refusal due to a communication terminal attribute disagreement to the communication node device 40 via the transmit/receive means 31 when the judging means 32 judges that a communication to the originating communication terminal 50 cannot be performed due to the communication terminal attribute disagreement.

After the communication refusal transmitting means 33 transmits a communication refusal, the notifying means 34 is notified that a destination call has been sent from the originating communication terminal 50 to the originating communication terminal 50 by the communication node device 40, and outputs the fact.

In the originating communication terminal 50, the transmit/receive means 51 interchanges information with the communication node device 40. When sending a destination message to the communication node device 40 via the transmit/receive means 51, the communication terminal attribute information factor inserting means 52 inserts an information factor indicating a communication terminal attribute in the originating message.

The information factor includes media conversion enable information which notifies said communication node device 40 that a user of the originating communication terminal 50 wants to execute a forced destination call to said destination communication terminal 30.

The notifying means 53 receives a notice that a communication has been established by performing a media conversion by the communication node device 40 via the transmit/receive means 51, and notifies the fact.

According to the present invention, the media converting means 60 can be arranged in the communication node device 40.

Furthermore, according to the present invention, the media converting means 60 may be arranged in a communications center different from the communication node device 40.

According to the present invention, when a telephone terminal and a facsimile terminal are respectively arranged as a communication terminal, the media converting means 60 has means for enabling a conversion of information between the telephone terminal and the facsimile terminal.

Furthermore, according to the present invention, when both a telephone terminal and a data terminal are respectively prepared as a communication terminal, the media converting means 60 has means for enabling a conversion of information between the telephone terminal and the data terminal.

According to the present invention, when both a telephone terminal and a picture telephone terminal are respectively prepared as a communication terminal, the media converting means 60 has means for enabling a conversion of information between the telephone terminal and the picture telephone terminal.

Moreover, according to the present invention, when both a facsimile terminal and a data terminal are respectively prepared as a communication terminal, the media converting means 60 has means for enabling a conversion of information between the facsimile terminal and the data terminal.

According to the present invention, when both a facsimile terminal and a picture telephone terminal are prepared for the communication terminal, the media converting means 60 has means for enabling a conversion of information between the facsimile terminal and the picture telephone terminal.

Furthermore, according to the present invention, when both a data terminal and a picture telephone terminal are respectively prepared as a communication terminal, the media converting means 60 has means for enabling a conversion of information between the data terminal and the picture telephone terminal.

In the present invention, when the originating communication terminal 50 calls to the destination communication terminal 30 via the communication node device 40, the communication terminal attribute information inserting means 52 in the originating communication terminal 50 inserts an information factor in a destination message sent to the communication node device 40 via the transmit/receive means 51. The information factor shows the attribute of the communication terminal.

In the destination communication terminal 30, the judging means 32 receives a destination message from the communication node device 40 to the originating communication terminal 50 via the transmit/receive means 31, and judges whether a communication to the originating communication terminal 50 can be established based on the information factor showing the attribute of the originating communication terminal 50 which is included in the destination message.

When the judging means 32 judges that a communication to the originating communication terminal 50 cannot be established due to a communication terminal attribute disagreement, the communication refusal transmitting means 33 transmits a communication refusal due to the communication terminal attribute disagreement to the communication node device 40 via the transmit/receive means 31.

The communication refusal recognizing means 42 recognizes a communication refusal from the destination communication terminal 30 due to communication terminal attribute disagreement via the transmit/receive means 41a in response to the destination message from the originating communication terminal 50 to the destination communication terminal 30. The destination message includes an information factor showing the communication terminal attribute.

Thus the selecting means 43 selects a medium being receivable by the destination communication terminal 30 when the communication refusal recognizing means 42 recognizes that the destination communication terminal 30 has performed a communication refusal due to the communication terminal attribute disagreement.

When the selecting means 43 selects a medium receivable by the destination communication terminal 30, the destination message correcting means 44 corrects the destination message from the originating communication terminal 50 based on the selection result.

The forwarding means 45 forwards the destination message corrected by the destination correcting means 44 to the destination communication terminal 30 via the transmit/receive means 41a.

When the forwarding means 45 establishes a communication by forwarding the corrected message, the media converting means 60 notifies the destination communication terminal 30 front the destination terminal notifying means 46 that there has been a destination call from the originating communication terminal 50 to the destination communication terminal 30. The notifying means 34 in the destination communication terminal 30 that has received the notice notifies of the completed destination call.

Furthermore, the originating communication terminal notifying means 47 notifies the originating communication terminal 50 that the media converting means has established the communication, via the transmit/receive means 41b.

The notifying means 53 in the originating communication terminal 50 that has received the notice notifies the fact.

The media converting means 60 enables an information conversion among the telephone terminal, the data terminal, facsimile terminal and picture telephone terminal.

As described above in detail, the service system according to the present invention has the following advantages:

(1) Even if a destination communication terminal sends a communication refusal signal, a forced calling can be performed through a media conversion process, whereby the user at the originating side can enjoy convenience.

(2) A user at an originating or destination side can exactly understand information regarding communications.

(3) Versatile communications can be realized between different kinds of terminals by performing a media conversion for which no registration is required between specific communications terminals.

(4) It is not needed that an originating party executes the media conversion process so that the present invention offers convenience for a user.

(b) An Embodiment of the Present Invention

An explanation will be made as for the embodiment of the present invention with reference to attached drawings.

Figure 2:
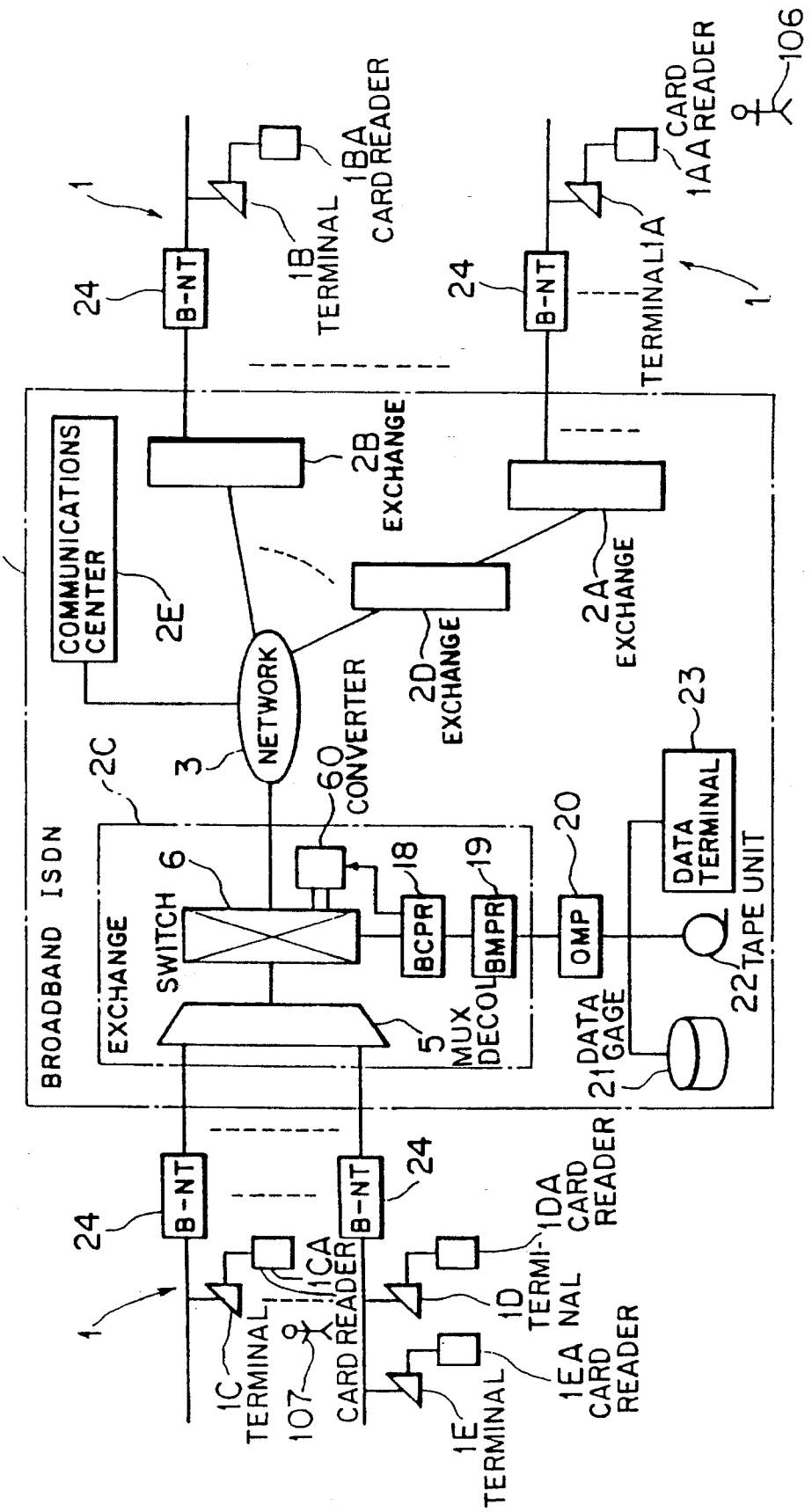
FIG. 2 is a block diagram showing an embodiment of the present invention.

FIG. 2 is a block diagram showing an embodiment of the present invention. In the present embodiment, the service system is applied to a so-called-universal personal telecommunication (UPT) using a broadband integrated services digital network (B-ISDN).

Referring to FIG. 2, the communication terminals 1A to 1E are respectively included in the exchanges 2A to 2C as a communication node device. Card readers 1AA to 1EA are respectively connected to the communication terminals 1A to 1E to register an user's ID information at a current communication terminal by means of an ID card.

In the communication terminals 1A to 1E, the communication terminal 1A, for example, is a telephone terminal housed in the exchange 2A or one used daily by a user 106. Hence the telephone number of the telephone terminal 1A is one owned by the user 106.

Numeral 1B represents a data terminal accommodated in the exchange 2B, 1C represents a FAX terminal accommodated in the exchange 2C, and 1D represents a picture telephone terminal accommodated in the exchange 2C, and 1E represents a telephone terminal accommodated in the exchange 2C. These terminals are conventionally used by the user 107. Hence the number of the telephone terminal 1E is one owned by the user 107.

The telephone terminal 1A, the data terminal 1B, the FAX terminal 1C, and the picture telephone terminals 1D and 1E are made of a different kind of terminal, respectively. The broadband ISDN network 4 can be connected between the terminals 1A to 1E so as to interconnect different kinds of terminals.

The broadband ISDN network 4 is constituted of exchanges 2A to 2C for enabling communication between the telephone terminal 1A, the data terminal 1B, the FAX terminal 1C, the telephone terminal 1D and the picture telephone terminal 1E, based on an exchange function, a network 3 for connecting interconnecting the exchanges 2A to 2C to one another, a transit exchange 2D for relaying between the exchange 2A and the exchange 2C, and the communications center 2E for performing a batch control of communications.

As shown in FIG. 2, according to the present embodiment, the exchange 2C is constituted of a multiplex decollator 5, an ATM switching module 6, a broadband call processor (BCPR) 18, a broadband main processor (BMPR) 19, and a media converting means 60.

The BCPR 18 is connected to the operation and maintenance processor (OMP) 20 via the BMPR 19 to control the operation of the ATM switching module 6. The OMP 20 executes the operating state monitor and the maintenance control of the exchange 2C.

When a communication is not established due to a communication terminal attribute disagreement, the media converting means 60 executes a signal conversion through which the attributes agree, thus providing a signal for establishing communication.

The signal conversion through which the attributes agree can be executed between arbitrary terminals selected from a telephone terminal, a FAX terminal, a picture terminal, and a data terminal, or between a telephone terminal and a FAX terminal, between a telephone terminal and a picture telephone terminal, between a telephone terminal and a data terminal, between a FAX terminal and a picture telephone terminal, between a FAX terminal and a data terminal, or between a picture telephone terminal and a data terminal.

Figure 4:
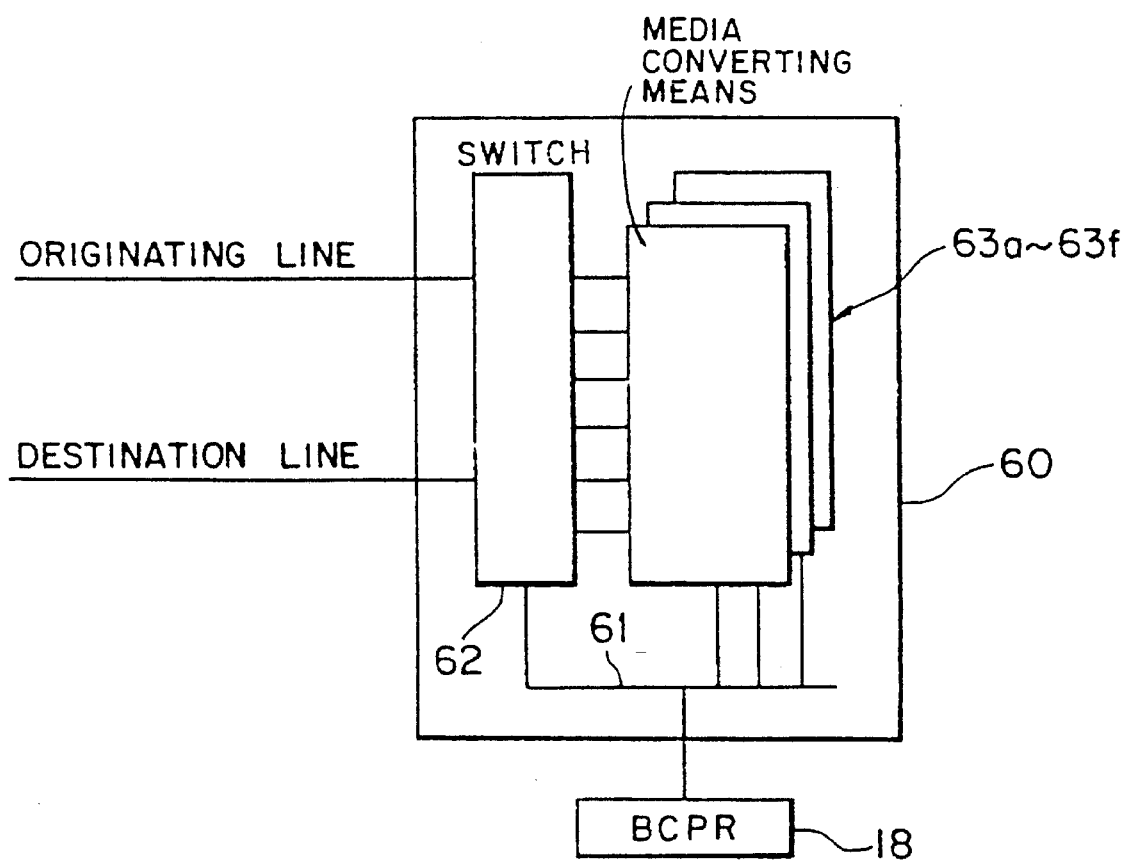
FIG. 4 is a block diagram showing media converting means according to an embodiment of the present invention.

The media converting means 60 has the structure shown in FIG. 4. That is, the media converting means 60 is constituted of media converting circuits 63a to 63f each for converting into a signal with a predetermined attribute in response to a control signal, and a changeover switch 62 for switching to a predetermined media converting circuit, based on a control signal inputted via the data bus 61.

Figure 5:
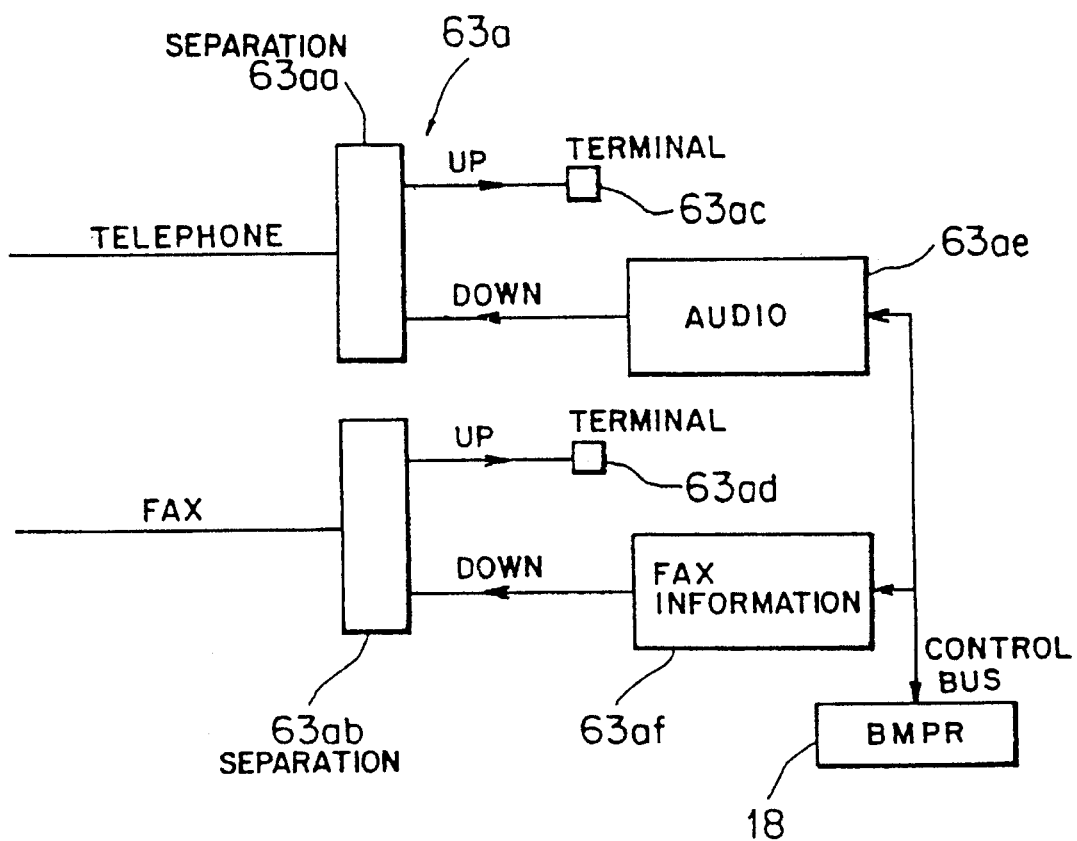
FIG. 5 is a diagram showing media converting circuits for a telephone terminal and a FAX terminal.

FIG. 5 is a diagram showing a media converting circuit 63a between a telephone terminal and a FAX terminal arranged in the media converting means 60 shown in FIG. 4. The media converting circuit 63a is constituted of a decollator 63aa for separating an up telephone signal from a down telephone signal; a decollator 63ab for separating an up FAX signal from a down FAX signal; a discarding unit 63ac for discarding an up telephone signal; a discarding unit 63ad for discarding an up FAX signal; an audio memory 63ae for storing audio information based on a control :signal from the BMPR 18, the audio information notifying the telephone terminal that a communication to the FAX terminal has been established in response to an originating call at a telephone terminal or that a destination call from the FAX terminal has been received; and a FAX memory 63af for storing FAX information based on a control signal from BMPR 18, the FAX information notifying the FAX terminal that a communication to the telephone terminal has been established in response to an originating call at a FAX terminal and that a destination call from the telephone terminal has been received.

When there has been a destination call between the telephone terminal and the FAX terminal, the destination communication terminal can be notified of the presence of the destination call while the originating communication terminal can be notified of the establishment of a communication.

Figure 6:
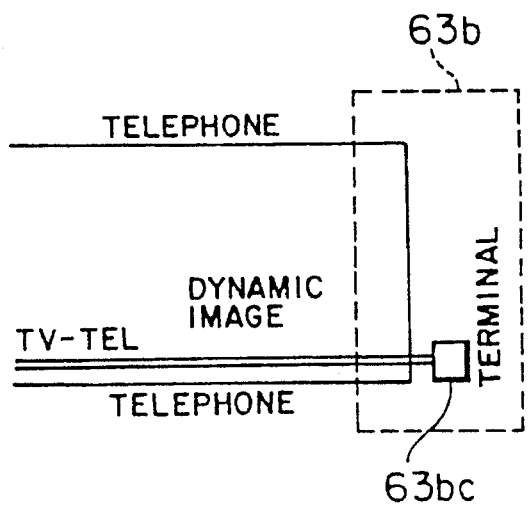
FIG. 6 is a diagram showing media converting circuits for a telephone terminal and a picture telephone terminal.

FIG. 6 is a diagram showing the media converting circuit 63b arranged between a telephone terminal and a picture telephone terminal in the media converting means in FIG. 4. The media converting means 63b includes a discarding unit 63bc for discarding up dynamic image information from the picture telephone terminal and performs only an audio communication by discarding dynamic information from the picture telephone terminal.

Figure 7:
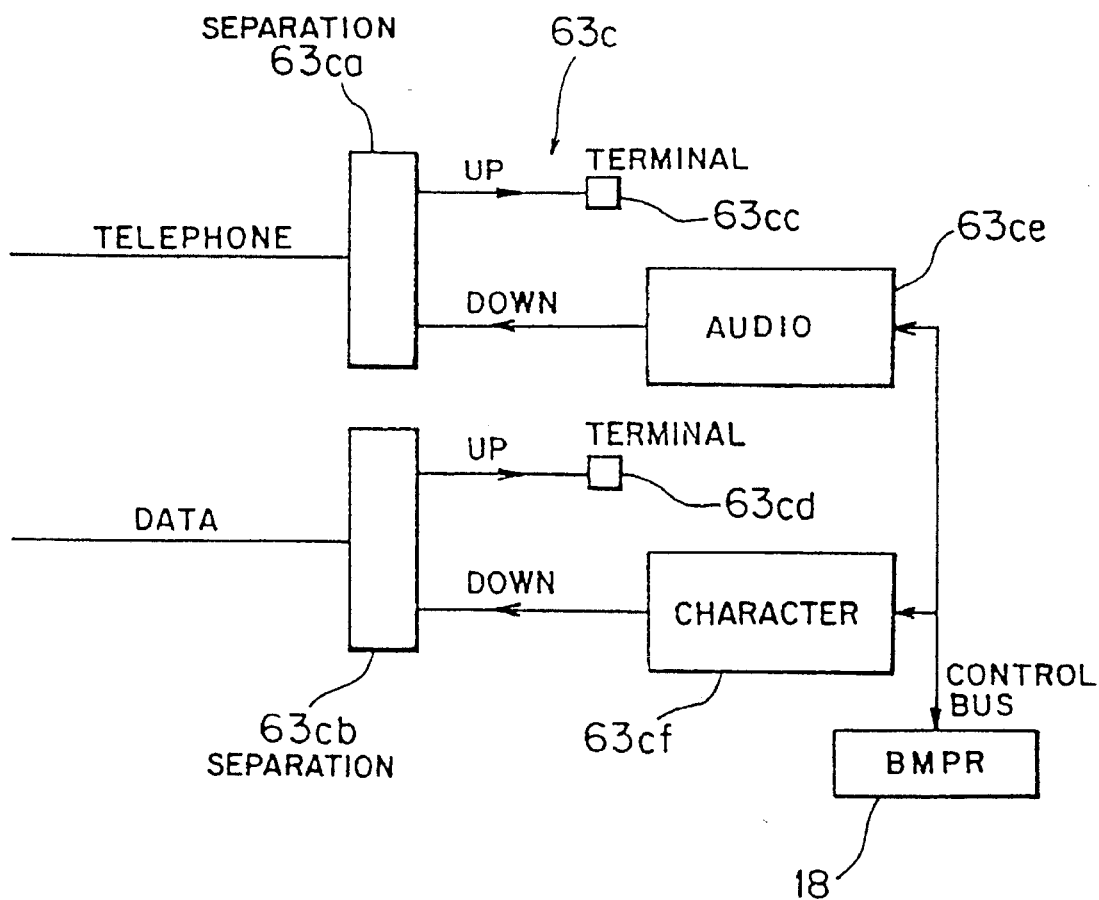
FIG. 7 is a diagram showing media converting circuits for a telephone terminal and a data terminal.

FIG. 7 is a diagram showing a media converting circuit 63c arranged between a telephone terminal and a data terminal in the media converting means in FIG. 4. The media converting circuit 63c is constituted of a decollator 63ca for separating an up telephone signal from a down telephone signal; a decollator 63cb for separating an up character signal from a down character signal; a discarding unit 63cc for discarding an up telephone signal; a discarding unit 63cd for discarding an up character signal; an audio memory 63ce for storing audio information based on a control signal from the BMPR 18, the audio information being used to notify the telephone terminal that a communication to the data terminal has been established in response to an originating call from the telephone terminal or that a destination call from the data terminal has been received; and a character memory 63cf for storing character information based on a control signal from the BMPR 18, the character information being used to notify the data terminal that a communication to the telephone terminal has been established in response to an originating call from the data terminal or that a destination call from the telephone terminal has been received.

Thus when there is a destination call between the telephone terminal and the data terminal, it is possible to notify that a destination call has; been established at the destination communication terminal while it is possible to notify that a communication has been established at the originating communication terminal.

Figure 8:
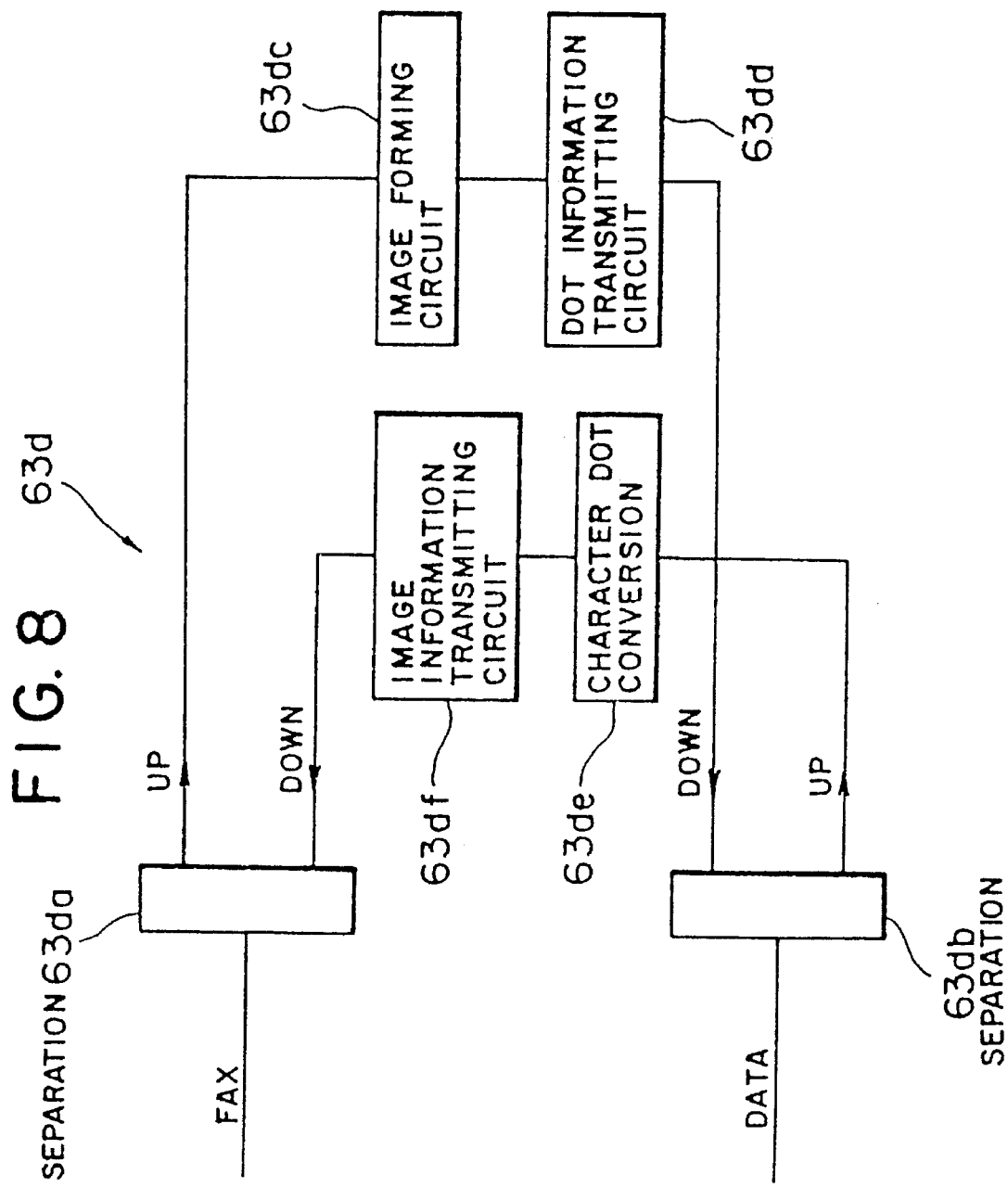
FIG. 8 is a diagram showing media converting circuits for a FAX terminal and a data terminal.

FIG. 8 is a diagram showing a media converting circuit 63d arranged between a FAX terminal and a data terminal in the media converting means 60 shown in FIG. 4. In order to execute communication between the FAX terminal and the data terminal, the media converting circuit 63d includes a decollator 63da for separating an up FAX signal from a down FAX signal; a decollator 63db for separating an up character signal from a down character signal; an image forming circuit 63dc for converting the up FAX signal into a signal sent to the data terminal; a dot information transmitting circuit 63dd for transmitting the signal converted by the image forming circuit 63dc to the data terminal; a character/dot converting unit 63de for converting the character information from the data terminal into dot information sent to the FAX terminal; and an image information transmitting circuit 63df for transmitting the dot information converted by the character/dot converting unit 63de to the FAX terminal.

Figure 9:
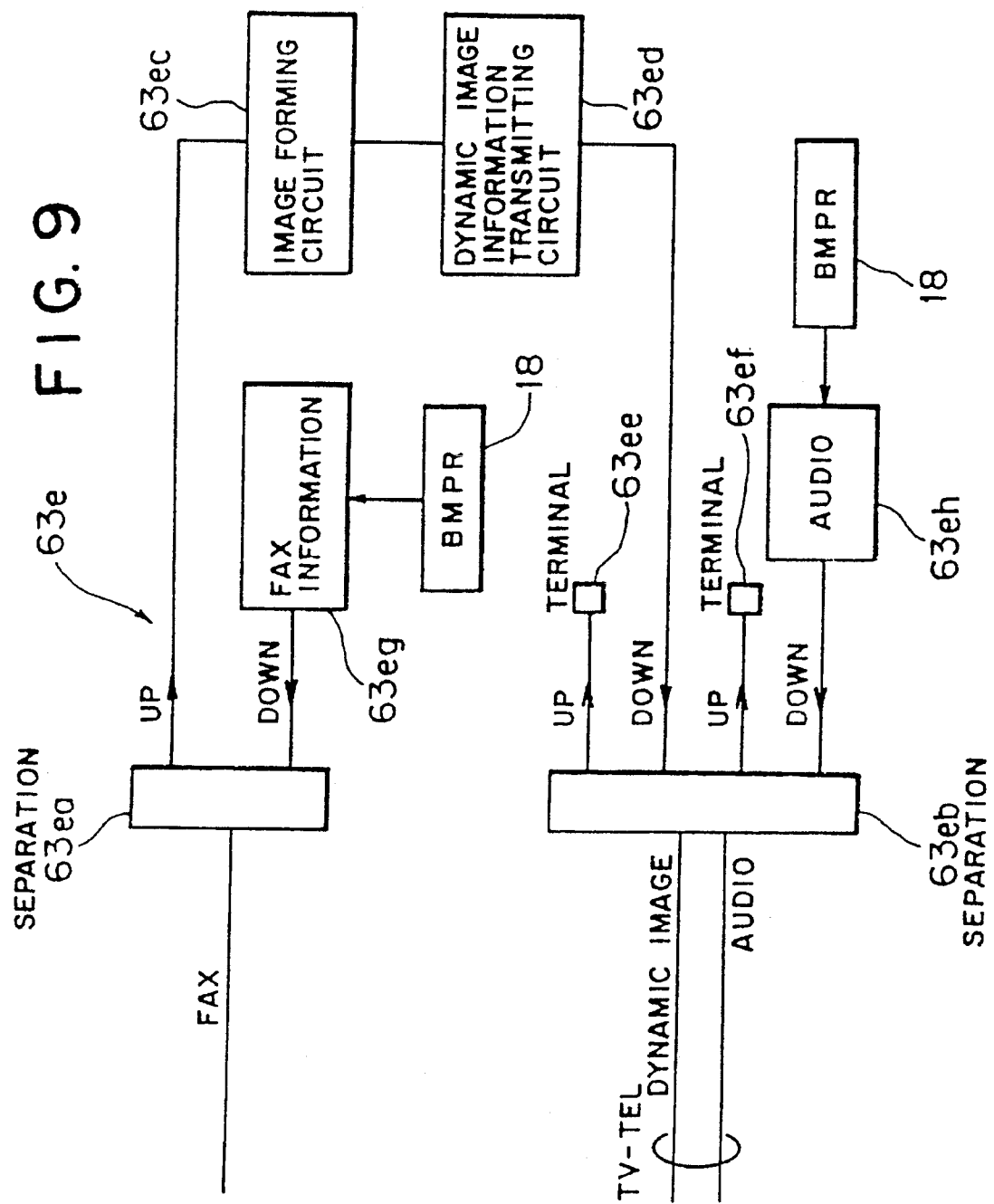
FIG. 9 is a diagram showing media converting circuits for a FAX terminal and a picture telephone terminal.

FIG. 9 is a diagram showing a media converting circuit 63e arranged between the FAX terminal and the picture telephone terminal in the media converting means 60 shown in FIG. 4. The media converting circuit 63e is constituted of a decollator 63ea for separating an up FAX signal from a down FAX signal; a decollator 63eb for separating an up dynamic image information signal from a down dynamic image information signal and simultaneously for separating an up audio signal from a down audio signal; an image forming circuit 63ec for converting the up FAX signal into a signal sent to the picture telephone terminal; a dynamic image information transmitting circuit 63ed for transmitting a signal converted by the image forming circuit 63ec as dynamic image information at the picture telephone terminal; a discarding unit 63ee for discarding the up dynamic image information signal from the picture telephone terminal; a discarding unit 63ef for discarding an up audio signal from a picture telephone terminal; a FAX memory 63eg for storing FAX information which notifies the FAX terminal that a communication to the picture telephone terminal has been established or that a destination call from the picture telephone terminal has been received, in response to an originating call to the FAX terminal after receiving a control signal from the BMPR 18 and; and an audio memory 63eh for storing audio information which notifies the picture telephone terminal that a communication to the FAX terminal has been established or that a destination call from the FAX terminal has been received, in response to an originating call to the picture telephone terminal after receiving a control signal from the BMPR 18.

Thus, when a destination call is made between the FAX terminal and the picture telephone terminal, the media converting means 63e can notify the destination communication terminal of the presence of a destination call while it can notify the originating communication terminal of an establishment of the communication.

FIG. 10 is a diagram showing a media converting circuit 63f arranged between the data terminal and the picture telephone terminal in the media converting means 60 shown in FIG. 4. The media converting circuit 63f is constituted of a decollator 63fa for separating and up character signal from a down character signal; a decollator 63fb for separating an up dynamic image information signal from an down dynamic information information signal and simultaneously for separating an up audio signal from a down audio signal; a character/dot converting unit 63fc for converting a character signal from the data terminal into dot information sent to the picture telephone terminal; a dynamic image information transmitting circuit 63fd for transmitting dot information converted by the character/dot converting unit 63fc as dynamic image information at the picture telephone terminal; a discarding unit 63fe for discarding the up dynamic image information signal; a discarding unit 63ff for discarding an up audio signal; a character memory 63fg for storing character information which notifies the data terminal that a communication to the picture telephone terminal has been established or that a destination call from the picture telephone terminal has been received, in response to an originating call to the data terminal after receiving a control signal from the BMPR 18 and; and an audio memory 63*fh* for storing audio information which notifies the picture terminal that a communication to the data terminal has been established or that a destination call from the data terminal has been received, in response to an originating call to the picture telephone terminal after receiving a control signal from the BMPR 18.

Thus, when a destination call is made between the data terminal and the picture telephone terminal, the media converting circuit 63*f* can notify the destination communication terminal of a presence of the destination call while it can notify the originating communication terminal of an establishment of the communication. As shown in FIG. 2, the OMP 20 is connected to a database 21 for data storage, a magnetic tape unit 22, and a data terminal 23 acting as a man-machine interface. A broadband network termination (B-NT) 24 is inserted between each of the exchanges 2A to 2C and communication terminals 1A to 1E.

The database 21 stores the telephone numbers of current user's terminals to addresses set for registered user's IDs.

When an user 107, for example, moves from a telephone terminal 1E used usually to a FAX terminal 1C, that he is at the FAX terminal 1C is registered in the address corresponding to his ID stored in the database 21, via his own ID card and the card reader 1CA connected to the FAX terminal 1C.

That is, the database 21 functions as a subscriber information database to register an user's current place. The ID card of the user 107 stores ID information including number information of the telephone terminal 1E used usually as a communication terminal.

The exchanges 2A and 2B have function similar to the exchange 2C. Hence a circuit similar to the OMP 20 is connected to each of the exchanges 2A and 2B.

When the user 106 dials the private telephone number of the user 107 using the communication terminal 1A, the exchange 2C retrieves the database 21 to find the number of the communication terminal (or number of the FAX terminal 1C) currently used by the user 107. The telephone from the user 106 via the communication terminal 1A is forwarded to the FAX terminal 1C.

Figure 3:
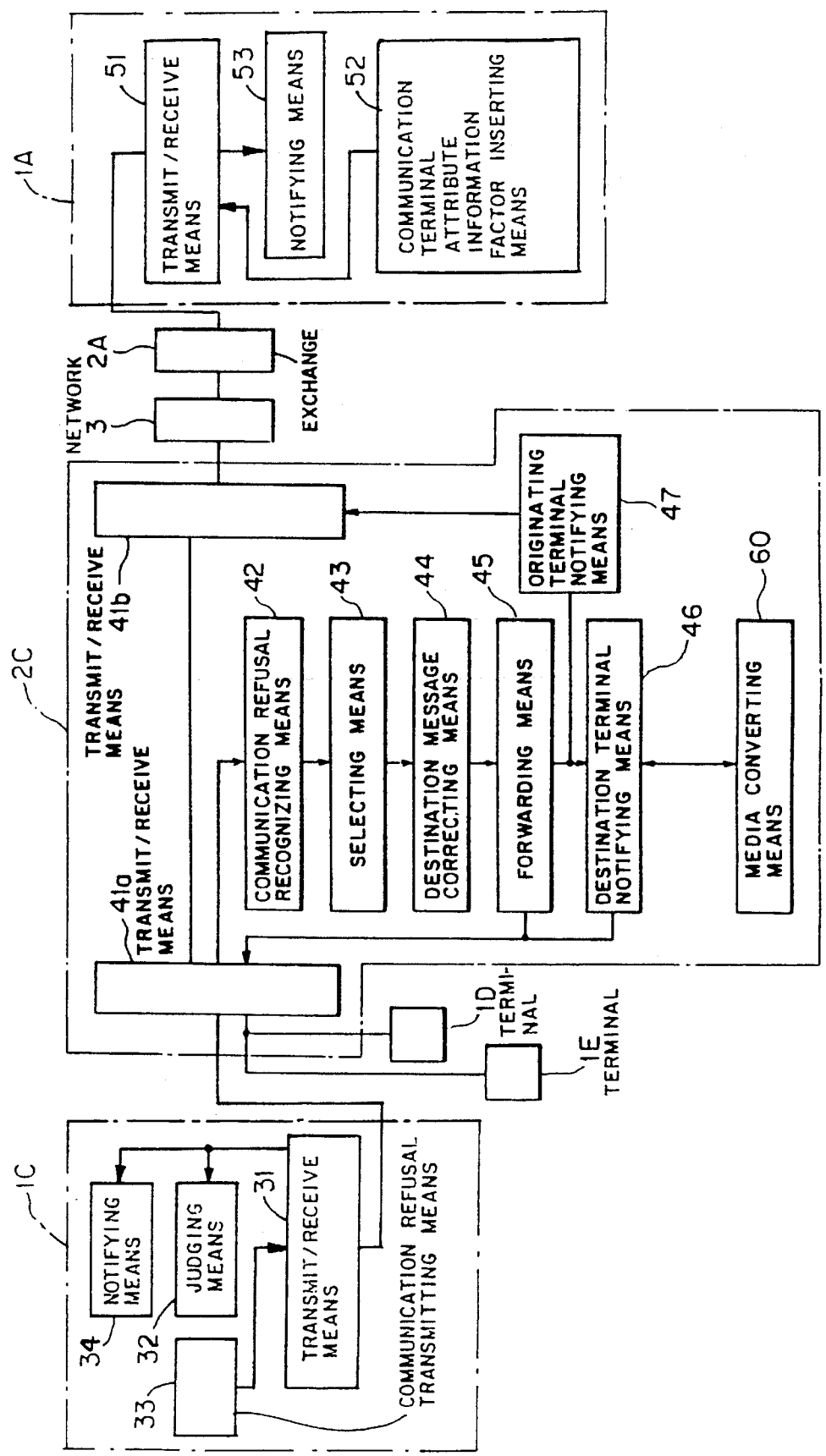
FIG. 3 is a functional block diagram showing the major portion of an embodiment according to the present invention.

FIG. 3 is a function block diagram showing how the telephone terminal 1A, the FAX terminal 1C and the exchange 2C function when the telephone terminal 1A calls the FAX terminal 1C, according to the concept of the present invention.

As shown in FIG. 3, the ex,change 2C acting as a communication node device includes functionally a transmit/receive means 41*a* and 41*b*, communication refusal recognizing means 42, selecting means 43, destination message correcting means 44, forwarding means 45, destination terminal notifying means 46, and originating terminal notifying means 47.

Next, the FAX terminal 1C acting as a destination communication terminal functionally includes transmit/receive means 31, judging means 32, communication refusal transmitting means 33, and notifying means 34.

The telephone terminal 1A acting as an originating communication terminal functionally includes transmit/receive means 51 communication terminal attribute information factor inserting means 52, and notifying means 53.

The transmit/receive means 51 interchanges information with the exchange 2C via the exchange 2A and the network 3. When a destination message is transmitted to the exchange 2C via the transmit/receive means 51, the communication terminal attribute information factor inserting means 52 inserts information factor indicating a communication terminal attribute to the destination message.

Figures 11A, 11B, 11C:
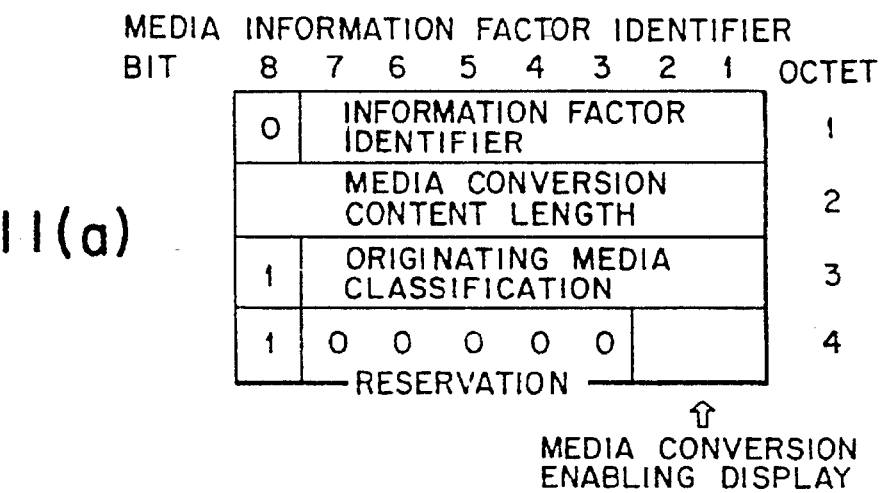
FIGS. 11(a) through 11(c) are diagrams used for explaining the operation of an embodiment according to the present invention.

That is, the telephone terminal 1A acting as an originating communication terminal inserts a media information factor identifier, as shown in FIG. 11(*a*), in a calling signal to the FAX terminal 1C as a destination communication terminal. The media information factor identifier is formed of bit information, as shown in FIGS. 11(*b*) and 11(*c*) and includes an originating media classification and a media conversion enable display.

The media conversion enable display, shown in FIG. 11(*c*), notifies the network 3 or the exchange 2C that the user 106 selected wants to execute a forced destination call to a different media terminal on the destination call side.

When receiving a notification on a communication establishment through a media conversion from the exchange 2C via the transmit/receive means 51, the communication means 53 notifies the same.

Next, in the exchange 2C, the transmit/receive means 41*a* interchanges information with the FAX terminal 1C and the transmit/receive means 41*b* interchanges information with the telephone terminal 1A. The multiplex decollator 5 and the ATM switching module 6, as shown in FIG. 2, function as the transmit/receive means 41*a* and 41*b*.

The communication refusal recognizing means 42 recognizes a communication refusal (REL-COM) due to communication terminal attribute disagreement from the FAX terminal 1C via the transmit/receive means 41*a*, in response to a destination message (destination SETUP signal) sent from a telephone terminal 1A to a FAX terminal 1C. The destination message has an information factor indicating the attribute of a communication terminal (in this case, information factor indicating that the originating communication terminal is a telephone terminal).

When the communication refusal recognizing means 42 recognizes that the FAX terminal 1C has rejected a communication due to a communication terminal attribute disagreement, the selecting means 43 selects a medium receivable by the FAX terminal 1C.

When the selecting means 43 selects a medium receivable by the FAX terminal 1C, the destination message correcting means 44 corrects the destination message from the telephone terminal 1A based on the selected result.

The forwarding means 45 forwards a destination message as a forced destination SETUP signal corrected by the destination message correcting means 44 to the FAX terminal 1C via the transmit/receive means 41*a*.

The destination communication terminal notifying means 46 notifies the FAX terminal 1C that the media converting means 60 (to be described later) has received a destination call from the telephone terminal 1A when the forwarding means 45 forwards a corrected destination message to establish a communication.

The originating communication terminal notifying means 47 notifies the telephone terminal 1A that a communication has been established by executing a media conversion, via the transmit/receive means 41*b*.

As described above, the AIUM exchange module 6 cooperates with the BCPR 18 so as to perform various functions made between the communication refusal recognizing means 42 and the originating terminal communication means 47.

In the FAX terminal 1C, the transmit/receive means 31 interchanges information with the exchange 2C.

The judging means 32, when a destination message from the telephone terminal 1A is received from the exchange 2C via the transmit/receive means 31, judges whether a communication to the telephone terminal 1A can be made on reference to the information factor indicating the originating communication terminal attribute included in the destination message (in this case, an information factor indicating the right telephone terminal).

That is, if an attribute agreement is obtained by comparing the attribute of an originating communication terminal with the attribute of a destination communication terminal (alone), it is judged that the communication between them is in an enable state. If not so, it is judged that the communication between them is not in an enable state.

When the judging means 32 judges that the communication terminal attribute disagreement does not allow the communication with the telephone terminal 1A, the communication refusal transmitting means 33 transmits a communication refusal due to the communication terminal attribute disagreement to the exchange 2C via the transmit/receive means 31.

After the communication refusal transmitting means 33 transmits a communication refusal, the exchange 2C notifies the notifying means 34 of a destination call from the telephone terminal 1A which has been sent from the exchange 2C to the FAX terminal 1C so that the communication means 34 notifies of the same.

In the above structure, for example, the user 107 moves from a telephone terminal 1E usually used to the FAX terminal 1C, that he is at the FAX terminal 1C is registered in an address in the database 21 corresponding to his ID using his ID card and the card reader 1CA connected to the FAX terminal 1C.

Hence when the user 106 dials the number of the user 107 using the communication terminal 1A, the exchange 2C retrieves the database 21 to obtain the current communication terminal number (number of the FAX terminal 1C) of the user 107, whereby the telephone from the communication terminal 1A by the user 106 can be forwarded to the FAX terminal 1C.

It will be explained below the case that the telephone terminal 1A calls to the FAX terminal 1C through the above forwarding operation. The service system of the present embodiment operates according to the flowchart shown in FIG. 12 and the sequence diagram shown in FIG. 13.

Figure 12:
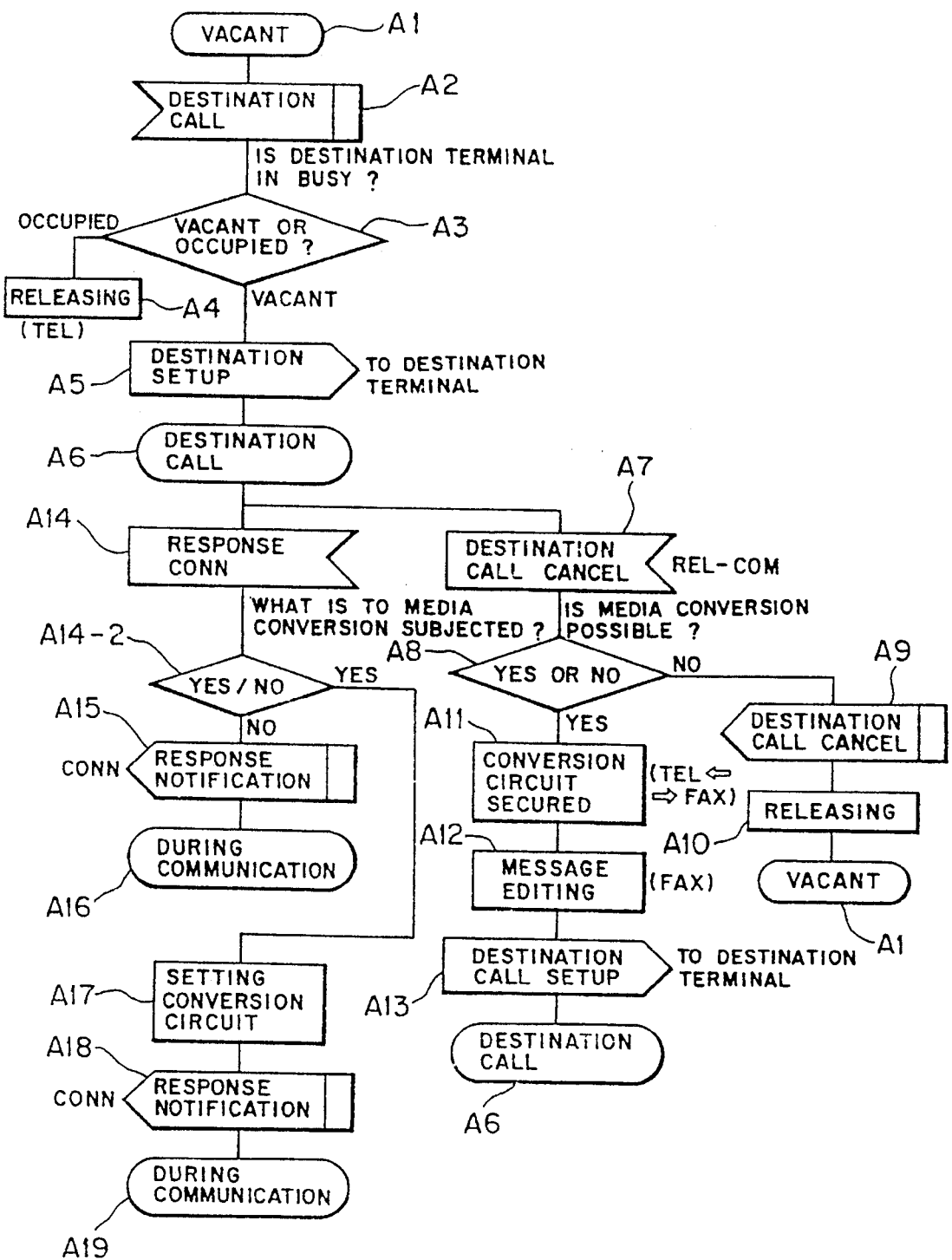
FIG. 12 a flowchart used for explaining the operation of the embodiment according to the present invention.

That is, referring to the flowchart shown in FIG. 12, when the telephone terminal 1A in a vacant state acting as an originating communication terminal calls the FAX terminal 1C in step A1, the exchange 2C receives the call in step A2.

Figure 13:
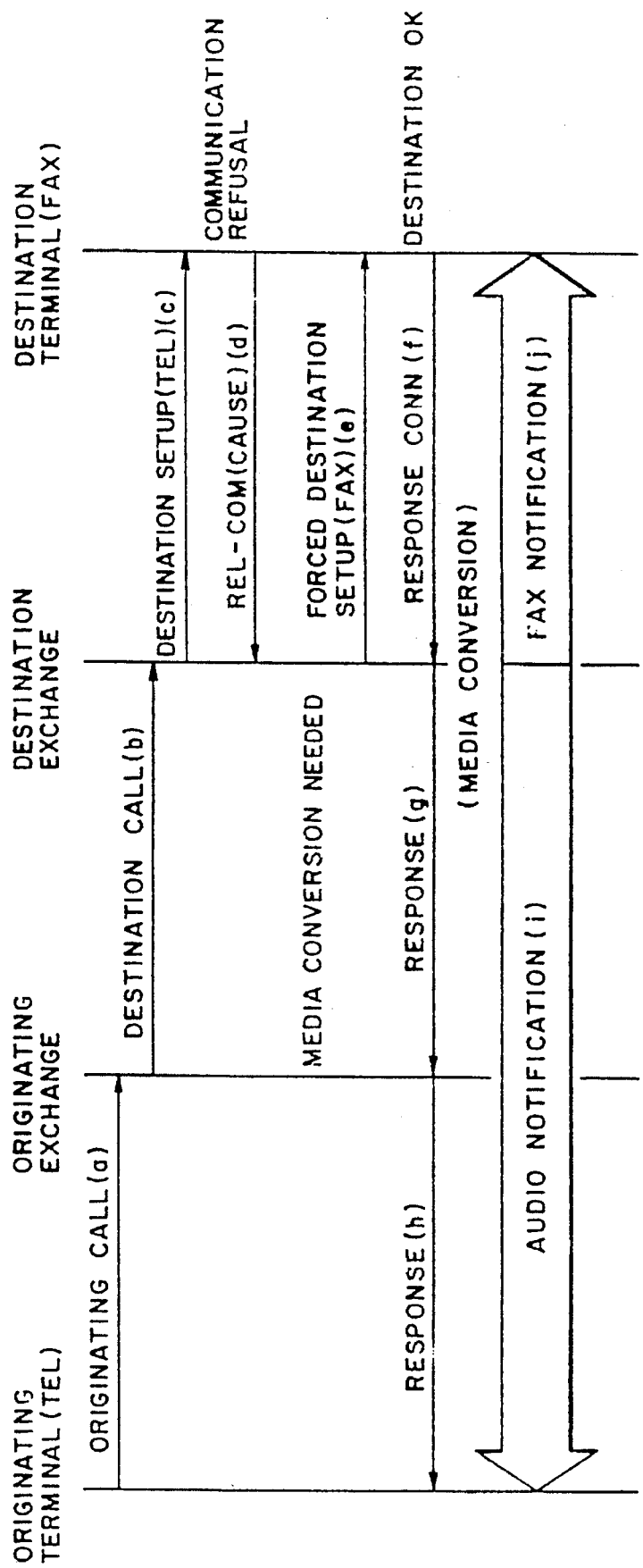
FIG. 13 is a sequence diagram used for explaining the operation of the embodiment according to the present invention.
Figure 14:
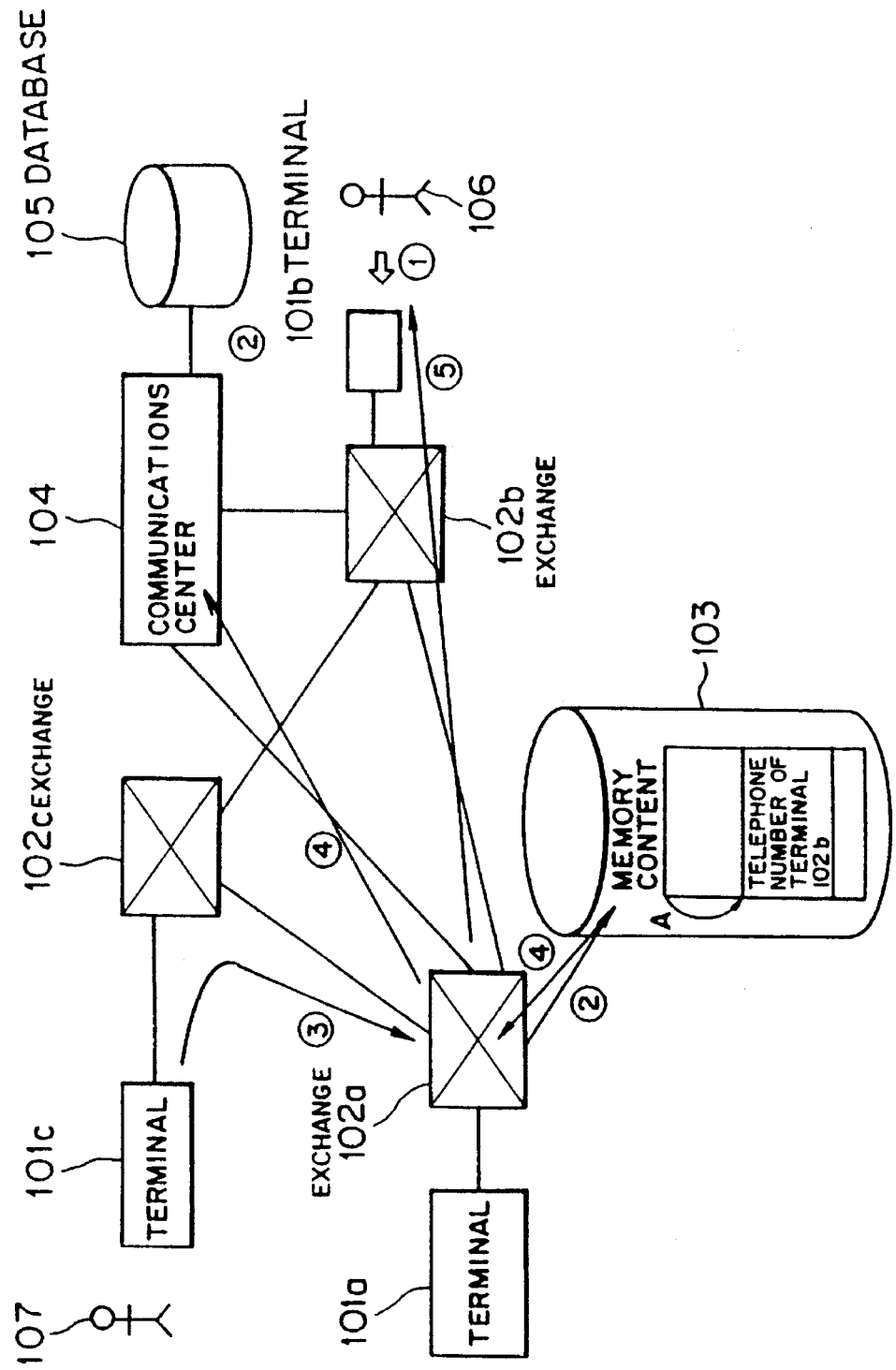
FIG. 14 is a diagram used for explaining a conventional UPT service system.

That is, when the exchange 2A receives a call signal including a media information factor identifier from the telephone terminal 1A (refer to (a) in the sequence diagram in FIG. 13), the exchange 2C receives the call via the network 3 (refer to (b) in the sequence diagram in FIG. 13).

In the step A3, when the FAX terminal 1C acting as a destination communication terminal is busy, a releasing process of the telephone terminal 1A is performed in the step A4. However, when the FAX terminal 1C is vacant, the destination SETUP signal is outputted from the telephone terminal 1A to the FAX terminal 1C in the step A5 (refer to (c) in the sequence diagram in FIG. 13). The destination communication terminal outputs; a response signal (CONN) indicating a destination enable state or a destination refusal signal (REL-COM) indicating a destination refusal state to the exchange 2C based on the media information factor identifier included in the destination SETUP signal (refer to (d) in the sequence diagram in FIG. 13).

That is, when the terminal attributes are agreed to each other, a response signal is outputted in the step A14 via the step A6. On the other hand, when the terminal attributes are disagreed to each other, a destination refusal signal is outputted in the step A7 via the step A6.

In the step A8, when the destination refusal is received by the exchange 2C, it is judged whether the exchange 2C can output a forced destination SETUP signal.

That is, when the destination exchange cannot output the forced destination SETUP signal because of a lack of various means arranged in the exchange 2C (shown in FIG. 3), it outputs a destination refusal to the telephone terminal 1A in the step A9 to perform the releasing process in the step A10, whereby the telephone terminal 1A becomes vacant (step A1).

However, like the exchange 2C shown in FIG. 3, when the destination exchange can output the forced destination SETUP signal, the selecting means 43 selects a medium (FAX terminal) receivable by the selecting means 43 in the step A11, based on the attribute information of the destination terminal included in the destination refusal REL-COM.

In the step A12, the destination SETUP signal from the telephone terminal 1A is corrected by the destination message correcting means 44 so that the FAX terminal 1C can receive the corrected one.

Then in the step A13, the forwarding means 45 outputs the corrected destination SETUP signal as a forced SETUP signal to the FAX terminal 1C (refer to (e)) in the sequence diagram in FIG. 13).

In the step A6, the FAX terminal 1C again receives in response to the forced SETUP signal. However, since the destination signal allows a communication, a response signal, which indicates that the call from the FAX terminal 1C is receivable, is outputted in the step A14 (refer to (f) in the sequence diagram in FIG. 13). Then, in the steps A17 to A19, a response signal is outputted to the telephone terminal 1A (refer to (g) and (h) in the sequence diagram in FIG. 13). Since the media converting means 60 executes a predetermined media conversion (in this case, a media conversion changed from the telephone terminal to the FAX terminal), the FAX terminal 1C is notified that there has been a destination call from the telephone terminal 1A while the telephone terminal 1A is notified that the communication to the telephone terminal 1A has been established (refer to (i) and (j) in the sequence diagram in FIG. 13).

When a response signal, which has been received by the exchange, is received from the destination communication terminal in the step A14, provided that it is judged that the response signal is transmitted between homogeneous communication terminals in the step A14-2, the response is sent to the originating communication terminal in the step A15. Thus a communication is established in the step A16.

As described above, according to the present invention, in heterogeneous terminals communications, when a destination SETUP signal is outputted from an originating communication terminal, the destination communication terminal outputs a communication refusal signal to, the destination exchange. However since the media converting process forcedly execute a destination call, the service system can advantageously offer convenience to an user on the originating side.

Furthermore, it can be notified that the destination communication terminal has received a destination call while it can be notified that a communication to the originating communication terminal has been established. Therefore there is advantage in that an user on an originating or destination side can certainly understand communication related information.

There is advantage in that various media conversions can be executed between communication terminals without registering a media conversion between specific communication terminals and in that removing the media conversion process by an originating party offers convenience to an user.

According to the present embodiment, a telephone terminal is used as an originating communication terminal while a FAX terminal is used as a destination communication terminal. It should be noticed that the present invention can be applied in an arbitrary combination among a telephone terminal, a FAX terminal, a picture telephone terminal and a data terminal acting as an originating communication terminal or destination communication terminal.

In the present embodiment, the communications center for entirely controlling communications may has the function of the exchange 2C.

In the present embodiment, the present invention has been applied to the UPT communications employing an ISDN network, but is applicable to conventional communication systems employing no ISDN network.

What is claimed is:

1. A service system for interconnecting heterogeneous communication terminals comprising a communication network, said communication network including:

plural communication terminals each treating a different medium;

a communication node device; and media converting means connected with said communication terminals via said communication node device;

said communication network including an information factor indicating an attribute of each of said communication terminals, said information factor being inserted in a message regarding a call establishment between each of said communication terminals and said communication node device;

said communication node device operating so as to select a medium receivable by a destination communication terminal of said communication terminals, to correct destination message from an originating communication terminal of said communication terminals, and to forward a corrected destination message to said destination communication terminal, when a communication refusal from said destination communication terminal due to a communication terminal attribute disagreement is recognized in response to the destination message sent from said originating communication terminal to said destination communication terminal;

said media converting means, after a communication has been established between said originating communication terminal and said destination communication terminal, notifying said destination communication terminal that a destination call from said originating communication terminal has been received and notifying said originating communication terminal that the communication has been established through a media conversion;

whereby said originating communication terminal is notified that the media conversion has established the communication.

2. A service system for interconnecting heterogeneous communication terminals according to claim 1, wherein said information factor indicating an attribute of each of said communication terminals inserted in the message regarding a call establishment between each of said communication terminals and said communication node device includes media conversion enable information which notifies said communication node device that a user of the originating communication terminal wants to execute a forced destination call to said destination communication terminal.

3. A service system for interconnecting heterogeneous communication terminals according to claim 1, wherein said media converting means is arranged in said communication node device.

4. A service system for interconnecting heterogeneous communication terminals according to claim 1, wherein said media converting means is arranged in a communications center separate from said communication node device.

5. A service system for interconnecting heterogeneous communication terminals according to claim 1, wherein said communication terminals include a telephone terminal and a facsimile terminal; and wherein said media converting means includes means for enabling an information conversion between said telephone terminal and said facsimile terminal.

6. A service system for interconnecting heterogeneous communication terminals according to claim 1, wherein said communication terminals include a telephone terminal and a data terminal, and wherein said media converting means includes means for enabling an information conversion between said telephone terminal and said data terminal.

7. A service system for interconnecting heterogeneous communication terminals according to claim 1, wherein said communication terminals include a telephone terminal and a picture telephone terminal, and wherein said media converting means includes means for enabling an information conversion between said telephone terminal and said picture telephone terminal.

8. A service system for interconnecting heterogeneous communication terminals according to claim 1, wherein said communication terminals include a facsimile terminal and a data terminal, and wherein said media converting means includes means for enabling an information conversion between said facsimile terminal and said data terminal.

9. A service system for interconnecting heterogeneous communication terminals according to claim 1, wherein said communication terminals include a facsimile terminal and a picture telephone terminal, and wherein said media converting means includes means for enabling an information conversion between said facsimile terminal and said picture telephone terminal.

10. A service system for interconnecting heterogeneous communication terminals according to claim 1, wherein said communication terminals includes a data terminal and a picture telephone terminal, and wherein said media converting means includes media for interchanging information between said data terminal and said picture telephone terminal.

11. A communication node device for use in a service system for interconnecting heterogeneous communication terminals, comprising:

transmit/receive means for interchanging information between communication terminals;

communication refusal recognizing means for recognizing a communication refusal via said transmit/receive means due to a communication terminal attribute disagreement from a destination communication terminal of said communication terminals in response to a destination message sent from an originating communication terminal of said communication terminals to said destination communication terminal, said destination message having an information factor indicating a communication terminal attribute;

selecting means for selecting a medium receivable by said destination communication terminal when said communication refusal recognizing means recognizes that said destination communication terminal has executed a communication refusal due to the communication terminal attribute disagreement;

destination message correcting means for correcting the destination message from said originating communication terminal based on a selection result when said selecting means selects a medium receivable by said destination communication terminal;

forwarding means for forwarding a corrected destination message from said destination message correcting means to said destination communication terminal via said transmit/receive means;

destination communication terminal notifying means for notifying said destination communication terminal that a destination call has been provided from said originating communication terminal via media converting means when a communication is established by forwarding the corrected destination message by said forwarding means; and originating communication terminal notifying means for notifying said originating communication terminal that the communication has been established through a media conversion, via said transmit/receive means.

12. A communication node device for use in a service system for interconnecting heterogeneous communication terminals, according to claim 11, wherein said information factor indicating an attribute of each of said communication terminals inserted in the message regarding a call establishment between each of said communication terminals and said communication node device, includes media conversion enable information which notifies said communication node device that a user of the originating communication terminal wants to execute a forced destination call to said destination communication terminal.

13. A communication terminal for use in a service system for interconnecting heterogeneous communication terminals, comprising:

transmit/receive means for interchanging information with a communication node device;

judging means for judging whether it is possible to communicate with an originating communication terminal, based on an information factor when a destination message sent from said communications node device to said originating communication terminal is received via said transmit/receive means, said information factor indicating an originating communication terminal attribute .included in said destination message;

communication refusal transmitting means for transmitting a communication refusal due to a communication terminal attribute disagreement to said communication node device via said transmit/receive means when said judging means judges that a communication is not performed to said originating communication terminal due to the communication terminal attribute disagreement; and notifying means for notifying that a destination call from said originating communication terminal has been sent from said communication node device to a destination communication terminal after said communication refusal transmitting means transmitted a communication refusal.

14. A communication terminal for use in a service system for interconnecting heterogeneous communication terminals, according to claim 13, wherein said information factor indicating an attribute of each of said communication terminals inserted in a message regarding a call establishment between each of said communication terminals and said communication node device, includes media conversion enable information which notifies said communication node device that a user of the originating communication terminal wants to execute a forced destination call to said destination communication terminal.

* * * * *